United States Patent
Song et al.

(10) Patent No.: US 6,597,860 B2
(45) Date of Patent: Jul. 22, 2003

(54) DIGITAL CAMCORDER APPARATUS WITH MPEG-2 COMPATIBLE VIDEO COMPRESSION

(75) Inventors: Dong-Il Song, Suwon (KR); Jong-Gu Jeon, Suwon (KR); Yong-Je Kim, Suwon (KR)

(73) Assignee: Samsung Electronics, Kyungki-do (KR)

(*) Notice: Subject to any disclaimer, the term of this patent is extended or adjusted under 35 U.S.C. 154(b) by 0 days.

(21) Appl. No.: 09/132,477

(22) Filed: Aug. 11, 1998

(65) Prior Publication Data

US 2002/0057902 A1 May 16, 2002

Related U.S. Application Data

(60) Provisional application No. 60/056,325, filed on Aug. 14, 1997.

(51) Int. Cl.[7] ............................................. H04N 5/91
(52) U.S. Cl. ........................ 386/68; 386/111; 386/112
(58) Field of Search .......................... 386/46, 111, 112, 386/107, 117, 68, 81, 109; 358/906; 348/409; 341/68; 360/41

(56) References Cited

U.S. PATENT DOCUMENTS

| | | | | |
|---|---|---|---|---|
| 5,432,651 A | * | 7/1995 | Maeno et al. | 360/41 |
| 5,488,433 A | * | 1/1996 | Washino et al. | 386/112 |
| 5,563,661 A | * | 1/1996 | Takahashi et al. | 358/906 |
| 5,543,932 A | * | 8/1996 | Chang et al. | 386/81 |
| 5,589,993 A | * | 12/1996 | Naimpally | 386/81 |
| 5,801,777 A | * | 9/1998 | Lyu | 348/409 |
| 5,862,295 A | * | 1/1999 | Shimoda et al. | 386/68 |
| 5,877,712 A | * | 3/1999 | Kim | 341/68 |
| 5,887,110 A | * | 3/1999 | Sakamoto et al. | 386/68 |
| 6,009,236 A | * | 12/1999 | Mishima et al. | 386/111 |
| 6,023,553 A | * | 2/2000 | Boyce et al. | 386/109 |
| 6,078,721 A | * | 6/2000 | Uchimi et al. | 386/68 |
| 6,124,995 A | * | 9/2000 | Kim | 360/48 |
| 6,205,286 B1 | * | 3/2001 | Nishimura et al. | 386/111 |

FOREIGN PATENT DOCUMENTS

| | | |
|---|---|---|
| JP | A 7-107466 | 4/1995 |
| JP | A 8-237601 | 9/1996 |
| JP | A 9-70016 | 3/1997 |

* cited by examiner

*Primary Examiner*—Huy Nguyen
(74) *Attorney, Agent, or Firm*—Sughrue Mion, PLLC

(57) ABSTRACT

A camcorder comprises a video camera responsive to light images for supplying video signals on a frame by frame basis; circuitry responsive to the video signals supplied by the video camera for generating segments of a transport stream, which segments are susceptible to decoding by an MPEG-2 decoding apparatus; and a recorder for electromagnetically recording the transport stream as magnetic variations along the surface of a magnetic recording medium.

13 Claims, 7 Drawing Sheets

DIGITAL CAMCORDER APPARATUS WITH MPEG-2 COMPATIBLE VIDEO COMPRESSION

This application is filed under 35 U.S.C. 111(a) claiming pursuant to 35 U.S.C. 119(e)(1) benefit of the filing date of provisional application serial No. 60/056,325 filed Aug. 14, 1997, pursuant to 35 U.S.C. 111(b).

The invention relates to digital camcorder video apparatus and, more particularly, to digital camcorder video apparatus using video compression techniques that are compatible with MPEG-2 decoding apparatus.

RELATED PATENT APPLICATIONS

A concurrently filed patent application of the inventors entitled "VIDEO TRANSMISSION APPARATUS EMPLOYING INTRA-FRAME-ONLY VIDEO COMPRESSION THAT IS MPEG-2 COMPATIBLE" is incorporated herein by reference for its showing of apparatus that can be used in conjunction with the digital camcorder video apparatus described in this specification and its accompanying drawing.

BACKGROUND OF THE INVENTION

Digital video cassette (DVC) electromagnetic tape recording is currently done using standards developed in a High-Definition Digital Video-Cassette-Recorder Conference. Five standards were established in that conference, including a standard for standard density (SD) recording in which one frame of NTSC video is recorded in 1350 syncblocks. These 1350 syncblocks, 90 syncblocks of accompanying audio and 44 syncblocks of overhead are distributed amongst ten successive helically recorded tracks on the electromagnetic recording tape. Syncblocks are uniform in bit length, and five syncblocks comprise a segment of five macroblocks of DCT. Each block of DCT is based on an 8-pixel-by-8-pixel block of 4:2:0 image data. That is, luminance (Y) is sampled twice as densely in the horizontal direction and in the vertical direction as the red-minus-luminance color difference signal (Cr) and as the blue-minus-luminance color difference signal (Cb). Each macroblock contains four blocks of discrete cosine transform (DCT) descriptive of Y and two blocks descriptive of Cr and Cb, which blocks are of variable bit length. While there are 385 bytes per segment in the SD standard, often as few as a hundred or less are required for transmitting DCT capable of generating images of requisite resolution. One of the objectives of the inventors was to more efficiently utilize the bytes available in each successive group of ten tracks, so that the number of null bytes is reduced and so that image resolution is improved by using those previously unused bytes.

The HD Digital VCR Conference established a high-density (HD) baseband standard in which each frame of a high-resolution television picture, together with accompanying audio and overhead, occupies twenty consecutive recording tracks. The conference defined further standards for recording direct video broadcasting (DVB), advanced television (ATV), PAL+ for Europe and EDTV-II for Japan. For the most part, the recording scheme for DVB simply involves the payload being formed from segments of the transport stream for this transmission medium. A similar observation can be made concerning the recording scheme for DVB. However, there are rules for the insertion of data to support trickplay reproduction from the recording, in addition to normal reproduction.

The high-resolution TV picture contemplated for HD baseband recording is of MUSE type with 1125 scan lines and 1200 luminance pixels per scan line. Those skilled in the art recognize that the HD baseband standard does not conform to any of the formats supported by the high-definition broadcast television standard established by the Advanced Television Systems Committee. The ATSC standard supports 480 scan lines with 640 luminance pixels per interlaced scan line, 480 scan lines with 720 luminance pixels per interlaced or progressive scan line, 720 scan lines with 1280 luminance pixels per progressive scan line, and 1080 scan lines with 1920 luminance pixels per interlaced scan line. A known practice is to record two data segments of ATSC digital television signal, each preceded by a time stamp, in five syncblocks of DTV signal.

The audio signals used as source signals in TV broadcasting are sampled at a frequency of 48 kHz, locked to the 27 MHz system clock, and are encoded according to the digital audio compression (AC-3) standard specified in the body of ATSC document A/52. The resulting compressed audio information is parsed into packets identified in the packet headers as being audio packets.

The video signals used as source signals in TV broadcasting are encoded according to the MPEG-2 video compression standard. The resulting compressed video information is parsed into packets identified in the packet headers as being video packets. Transmission is by groups of pictures, each group of pictures (GOP) containing coding for an initial anchor frame referred to as an "I frame", subjected solely to intraframe video compression, followed by coding for a succession of other frames subjected to interframe compression coding. These other frames comprise so-called "P frames" and so-called "B frames". Coding for each P frame is based on differences of that video frame in actuality from that frame as predicted by extrapolation from a most recent previous one of the I and P frames, in accordance with motion vectors derived by block comparison between the more recent of these previous I and P frames. Coding for each B frame is based on differences of that video frame in actuality from that frame as predicted by bidirectional interpolation from a preceding one and a succeeding one of the I and P frames.

MPEG-2 compressed video is suited to an application, such as television broadcasting, where there is not much concern with regard to the difficulty of editing video information in this transport stream format. In applications where ease of editing video is of concern, preferably video compression is done relying not at all on interframe compression techniques, but just on intraframe video compression techniques. Ease of editing video is desirable for editing of video recordings to delete undesired frames, to introduce frame repetition for achieving slow-motion or stop-motion effects, and to insert reverse motion sequences. By way of further examples, ease of editing video is also desirable for extracting still pictures from camcorder recordings, for extracting selected video for transmission over the internet and for editing commercials out of video recorded from broadcast television.

In systems for processing video in which ease of editing video is of concern, the inventors advocate intraframe video compression encoding every successive video frame in accordance with the way intraframe video compression encoding is done on I anchor frames in MPEG-2. Each frame is then identified as being intraframe video compression encoded in the picture headers, the same way it is done for anchor frames in MPEG-2. A conventional MPEG-2 encoder can be modified to carry out this video compression algorithm. Alternatively, the encoder for encoding just anchor or I frames can be considerably simplified from the encoder required for coding P frames and B frames as well as I frames, since there is no need for the motion estimation circuitry that forms a substantial part of a complete MPEG-2 encoder. The motion estimation circuitry requires memory with storage capability for plural frames of video information. The inventors prefer such a simplified encoder be used in a digital camcorder for reducing power drain on the camcorder battery and for shaving the weight and size of the camcorder.

In many systems for processing video in which ease of editing video is of concern, an MPEG-2 decoder is already available for use in decoding continuous intraframe video compression encoding descriptive of consecutive video frames. So there is no additional cost for a decoder to decode the transport stream of I frames without intervening P or B frames. If an MPEG-2 decoder is not already available in a system, providing such a decoder is reasonable in cost, since the amount of hardware in an MPEG-2 decoder is considerably less than that in an MPEG-2 encoder. Alternatively, a modified MPEG-2 decoder only for I frames can be used.

SUMMARY OF THE INVENTION

The invention is embodied in a camcorder comprising a video camera responsive to light images for supplying video signals on a frame by frame basis; circuitry responsive to the video signals supplied by the video camera for generating segments of a transport stream, which segments are susceptible to decoding by an MPEG-2 decoding apparatus; and a recorder for electromagnetically recording the transport stream as magnetic variations along the surface of a magnetic recording medium.

DETAILED DESCRIPTION OF THE PREFERRED EMBODIMENTS

Figure 1:
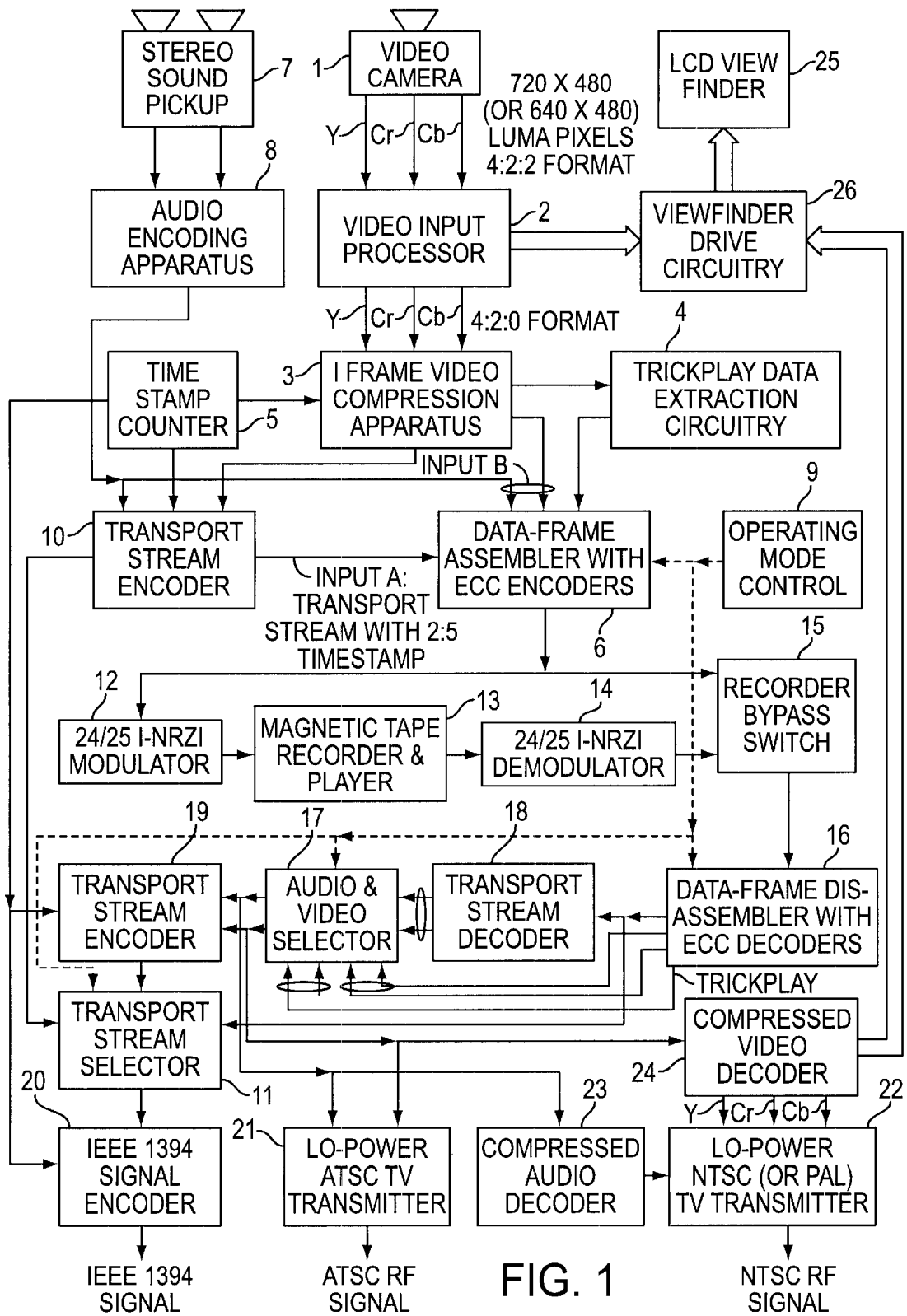
FIGS. 1, 2, 3 and 4 are each a schematic diagram of a respective camcorder embodying the invention.

FIG. 1 shows a camcorder embodying the invention. A video camera 1 generates frames of video information in 4:3 aspect ratio including luminance (Y) information having 480 active scan lines in each frame and 720 (or, alternatively, 640) pixels in each scan line. In a camcorder for home use the video camera 1 generally employs a single solid-state imager with a color pattern filter; in a camcorder for broadcast use the video camera 1 generally employs beam splitter optics with respective solid-state imager for each of three additive primary colors. Either type of video camera 1 is presumed to include color matrixing circuitry such that the video camera 1 supplies luminance (Y) information, red-minus-luminance (Cr) chrominance information, and blue-minus-luminance (Cb) chrominance information as the components of video information in 4:2:2 format.

A video input processor 2 converts the Y, Cr, and Cb signals to 4:2:0 sampling format by performing a 2:1 decimation of each of the Cr and Cb signals in both the vertical and the horizontal directions after separable lowpass anti-aliasing filtering in both directions. The video information from the video camera 1 has two line interlaced fields in each frame of one-thirtieth second duration, or instead is progressively scanned with frames each of one-sixtieth second duration. Designs for respective lowpass anti-aliasing filtering appropriate for each alternative are known to persons skilled in the art.

If there are two line interlaced fields in each frame, a 7-tap vertical lowpass anti-aliasing filter is used in odd fields; and a 4-tap vertical lowpass anti-aliasing filter is used in even fields. Then the earlier and later fields of each frame are interlaced line by line into a complete frame for compression encoding. This procedure generates a succession of frames each of one-thirtieth second duration.

If the video camera 1 supplies progressive scan video information with frames each of one-sixtieth second duration, after the video input processor 2 converts the Y, Cr, and Cb signals to 4:2:0 sampling format, the number of frames can be decimated 2:1 by using a pseudo field interlace method to generate pseudo-field-interlace frames occurring at halved frame rate. Suppose the frames of video information are numbered modulo-2 that in order of their occurrence, and the lines in each frame are consecutively numbered in order of their occurrence. The amplitudes of Y, Cr, and Cb pixels in odd scan lines of each odd frame are combined with their counterparts in the immediately preceding even frame to generate odd-line fields of the pseudo-field-interlace frames occurring at halved frame rate. The amplitudes of Y, Cr, and Cb pixels in even scan lines of each odd frame are combined with their counterparts in the immediately succeeding even frame to generate even-line fields of the pseudo-field-interlace frames occurring at halved frame rate.

Video compression apparatus 3 receives the Y, Cr, and Cb signals in 4:2:0 sampling format for video compression encoding. Video compression apparatus 3 also receives the output count of a time stamp counter 5, which counts system clock cycles in each group of sixteen video frames. This output count accompanies compressed video signal components in order to keep track of the order in which they were generated. Video compression encoding is carried out on an intraframe basis on every one of the frames. This is done in accordance with the same intraframe compression encoding protocol used on only the first, anchor frame of each group of pictures in MPEG-2 video compression encoding. This intraframe compression encoding protocol proceeds by considering each frame of the Y, Cr, and Cb signal samples to be composed of a close-packed array of 8-pixel-by-8-pixel blocks arranged in rows and in columns. The discrete cosine transform (DCT) of each of these 8-pixel-by-8-pixel blocks is calculated in a prescribed order. The DCT coefficients of each 8-pixel-by-8-pixel block of video signal samples are quantized and supplied in a prescribed order as bit-serial binary numbers to form a string of bits descriptive of a respective DCT block. The succession of DCT blocks are then entropy encoded, which includes run-length coding followed by variable-length encoding based upon a table of presumed statistics. The MPEG-2 standard for video compression includes recommended tables for entropy encoding. Quantization of the DCT results is adjusted in order that the intraframe coding result for each frame fits within a 103,950 byte limit (77 bytes of data per sync block times 1350 sync blocks of video information per NTSC frame).

The video compression apparatus 3 supplies compressed video information for each consecutive frame generated according to the MPEG-2 intraframe-coding algorithms for I frames. The sequence headers, GOP headers, picture headers, slice headers and macroblock headers are inserted into this compressed video information by the video compression apparatus 3. The picture header includes an I-frame coding flag, which will condition any MPEG-2 decoder used during playback from the videocassette recording to decode the compressed video information on an intraframe basis. This is so whether the compressed video information is recorded directly or is recorded after being encoded into an MPEG-2 transport stream.

The FIG. 1 camcorder is designed to be compatible with a digital videocassette recorder and player in regard to trickplay. Trickplay extraction circuitry 4 extracts trickplay information comprising the zero-frequency and other low-frequency DCT coefficients of the succession of DCT blocks of every anchor frame as computed in the video compression apparatus 3. In embodiments of the invention in which every frame is encoded as an anchor I frame, the trickplay information changes more frequently than in conventional MPEG-2 encoding, but this is acceptable. In a variant of the just described procedure, every frame is encoded as an I frame, but only every sixteenth frame is treated as an anchor frame. In these alternate embodiments of the invention, every sixteenth frame is stored for a sixteen-frame period and used to support generation of trickplay information, more like what is done in conventional MPEG-2 encoding. However, embodiments of the invention not using this variant are currently preferred, since avoiding frame storage for every sixteenth frame reduces the cost and complexity of the video compression apparatus 3 appreciably. The trickplay extraction circuitry 4 parses the truncated DCT blocks so extracted into syncblocks supplied to a data-frame assembler 6 for insertion amongst other syncblocks containing compressed normal-play video information or compressed audio information. The insertion is done in accordance with a conventional prescribed pattern that forms bands of trickplay information in alternate recording tracks on the magnetic tape. The data-frame assembler 6 is otherwise the same as those used in a standard-definition digital-video-cassette recorder (SD DVCR).

Stereo sound pickup apparatus 7 is presumed to be associated with the video camera 1 in the FIG. 1 camcorder and to supply a left-channel (L) signal and a right-channel (R) signal. The L and R signals are supplied to audio encoding apparatus 8 for compression encoding that generates compressed audio information. Compression encoding can be done in any of a number of ways such as according to MPEG standard, according to the AC-3 standard when recording digital television as broadcast in the United States, or according to a pulse code modulation (PCM) scheme.

Responsive to a control setting by a user of the FIG. 1 camcorder, an operating mode control 9 conditions the camcorder to operate in accordance with a first data-frame-assembly mode. In this first data-frame-assembly mode the compressed video information from the video compression apparatus 3 and the compressed audio information from the audio encoding apparatus 8 are utilized directly by a data-frame assembler 6. The assembler 6 includes forward error-correction-code encoders for video and for audio. The compressed video information is temporarily stored in row and column array within a video portion of memory in the assembler 6. The compressed audio information is temporarily stored in row and column array within an audio portion of memory in the assembler 6. Per custom in SD DVCRs, the forward ECC encoder for video is a two-dimensional Reed-Solomon encoder using (149,138) outer coding circuitry and (85, 77) inner coding circuitry. The video portion of the memory in the assembler 6 is operated as an interleaver for this forward ECC encoder. Per custom in SD DVCRs, the forward ECC encoder for audio is a two-dimensional Reed-Solomon encoder using (14,9) outer coding circuitry and (85, 77) inner coding circuitry, with the audio portion of the memory in the assembler 6 being operated as an interleaver for this forward ECC encoder. The data-frame assembler 6 includes circuitry for prefacing each 85-byte row of forward error-correction-coded information with a 5-byte header when read as a syncblock from the memory in the assembler 6. This 5-byte header comprises a 2-byte synchronization code followed by a 3-byte identification (ID) code.

The operating mode control 9 can alternatively have a user control setting that conditions the FIG. 1 camcorder for operation in accordance with a second data-frame-assembly mode. In this second data-frame-assembly mode a transport stream supplied from a transport stream encoder 10 is utilized as input signal by the data-frame assembler 6, rather than the compressed video information supplied directly from the video compression apparatus 3 and the compressed audio information from the audio encoding apparatus 8. The transport stream encoder 10 parses the compressed video information into pairs of consecutive MPEG-2 video packets preceded by packet headers, each beginning with a time stamp. The transport stream encoder 10 parses the compressed audio information into consecutive audio packets preceded by packet headers beginning with a time stamp. Each audio packet follows the packet header with auxiliary audio information containing codes indicative of the type of audio encoding that was used to generate the audio packets. This auxiliary audio information is forwarded to the transport stream encoder 10 from the audio encoding apparatus 8. The transport stream encoder 10 assembles the video and audio packets into a first transport stream supplied to a transport stream selector 11. The transport stream encoder 10 also assembles a second transport stream differing from the first transport stream in that extra time stamps as extracted from the time stamp counter 5 are inserted. This is done to implement 2:5 conversion, in which each consecutive pair of the 188-byte packets in this second transport stream are written into five rows of the memory in the data-frame assembler 6, for subsequent reading as five sync blocks from the assembler 6. A set of MPEG packs that specify the specific video and audio compression formats used in generating the transport stream are loaded from the transport stream encoder 10 into the data-frame assembler for insertion into the $19^{th}$, $20^{th}$ and $156^{th}$ syncblocks of each data frame.

The further details of the data-frame assembler 6 will be familiar to one skilled in the art, conforming to "Specifications of Consumer-Use Digital VCRs using 6.3 mm magnetic tape" issuing from the December 1994 HD Digital VCR Conference. The sync blocks supplied from the data-frame assembler 6 are applied to a 24/25 modulator 12 as a modulating signal that governs the generation of interleaved-NRZI modulation. This I-NRZI modulation is supplied to the recording amplifier of a magnetic tape recorder (and player) 13 that is a component of the FIG. 1 camcorder and is of helical recording type. The I-NRZI modulation results are without substantial direct component, so the amplified modulation results can be transformer coupled without loss of information to heads of the tape recorder 13 during times of recording. This transformer coupling is done by a rotary transformer between the head drum and the main body of the tape recorder 13, which main body contains the mechanism for transporting magnetic tape recording medium past the head drum.

During times of playback from the magnetic tape recording medium, electric signals induced in the heads of the magnetic tape recorder and player 13 by magnetic changes in the moving medium are coupled through the rotary transformer to a playback amplifier in the recorder and player 13. This playback amplifier supplies 24/25 I-NRZI modulation to a demodulator 14 for 24/25 I-NRZI modulation, which demodulator 14 reproduces the error-correction-coded syncblocks supplied from the data-frame assembler 6 for recording. A recorder bypass switch 15 is set in response to the desire of a user to select either the error-correction-coded syncblocks supplied from the data-frame assembler 6 or the error-correction-coded syncblocks reproduced by the 24/25 I-NRZI demodulator 14 to be supplied to a data-frame disassembler 16.

The data-frame disassembler 16 corrects errors in the signal supplied thereto and accordingly includes decoders for the Reed-Solomon forward error-correction-codes. The data-frame disassembler 16 includes temporary-storage memory for video, which memory is operated as an interleaver for the video ECC decoder. The data-frame disassembler 16 also includes temporary-storage memory for audio, which memory is operated as an interleaver for the audio ECC decoder.

When the user control setting of the operating mode control 9 selects normal play in accordance with the first data-frame-assembly mode, an audio/video selector 17 selects as its output signal compressed video information and compressed audio information read from respective temporary-storage memory in the data-frame disassembler 16. The compressed video information and compressed audio information are read to the audio/video selector 17 after error correction of the information by the ECC decoders in the data-frame disassembler 16 has been completed. In this mode the compressed-video decoder 24 decodes compressed video information from the audio/video selector 17 on an I-frame-only basis. If the compressed-video decoder 24 has the capability of decoding B or P frames as well as I frames, the decoder 24 is conditioned to decode on an I-frame-only basis responsive to the picture headers in the compressed video signal. If desired, the design can be such that the decoder 24 is conditioned to decode on an I-frame-only basis responsive to the user control setting of the operating mode control 9.

When the user control setting of the operating mode control 9 selects normal-play in accordance with the second data-frame-assembly mode, the audio/video selector 17 selects as its output signal compressed video information and compressed audio information supplied by a transport stream decoder 18. The compressed video information and compressed audio information are decoded from video packets and audio packets read to the decoder 18 from respective temporary-storage memory in the data-frame disassembler 16. The video packets and audio packets are read to the transport stream decoder 18 after error correction of the packets by the ECC decoders in the data-frame disassembler 16 has been completed. If the compressed-video decoder 24 has the capability of decoding B or P frames as well as I frames, the decoder 24 is conditioned to decode on an I-frame-only basis responsive to the picture headers in the compressed video signal indicating that this was the mode in which the DVCR tape cassette being played back was recorded.

When the user control setting of the operating mode control 9 selects trickplay, the output signal that the audio/video selector 17 supplies comprises null compressed audio information supplied as wired input and compressed video information recorded as trickplay signal, then read from temporary-storage memory in the data-frame disassembler 16 during playback. The audio recovered by the compressed-audio decoder 23 is muted. If the compressed-video decoder 24 has the capability of decoding B or P frames as well as I frames, the decoder 24 is conditioned to decode on an I-frame-only basis responsive to the user control setting of the operating mode control 9.

The compressed video information and compressed audio information the audio/video selector 17 selects as its output signal is supplied to a transport stream encoder 19. The transport stream encoder 19 supplies the transport stream selector 11 with a transport stream that is available when normal play in accordance with the first data-frame-assembly mode is the operating mode selected for the FIG. 1 camcorder by the operating mode control 9. The transport stream selector 11 responds to control setting by the user of the FIG. 1 camcorder either to reproduce in its output signal the transport stream before recording, as supplied thereto by the transport stream encoder 10, or another transport stream after playback from the tape recorder 13. The transport stream selector 11 automatically selects the output signal from the transport stream encoder 19 as this other transport stream responsive to the operating mode control 9 selecting playback in accordance with the first data-frame-assembly mode. Responsive to the operating mode control 9 selecting playback in accordance with the second data-frame-assembly mode, the transport stream selector 11 automatically selects the output signal from the data-frame disassembler 16 to the transport stream decoder 18 as the other transport stream after playback that the selector 11 can reproduce as its output signal.

In a variation from what is shown in FIG. 1 that does not alter ultimate camcorder performance very much, the other transport stream after playback from the tape recorder 13 can always be the output signal from the transport stream encoder 19.

The transport stream reproduced in the output signal of the transport stream selector 11 is supplied to an IEEE 1394 signal encoder 20. The IEEE 1394 signal encoder 20 prefaces each 188-byte packet in the transport stream with a 4-byte time stamp, apportions each 192-byte time-stamped packet among shorter data blocks (e.g., each of 96-byte length), and precedes each data block with a header for accessing the transmission line and a CIP header. The CIP header contains information as to the apportionment of the 192-byte time-stamped packet and as to when data of similar characteristics is next to appear in the datastream.

FIG. 1 shows the compressed video information and compressed audio information the audio/video selector 17 selects as its output signal being applied to a low-power ATSC television transmitter 21 adapted for transmitting a radio-frequency signal to a digital television receiver. This is an optional feature for a camcorder embodying the invention. A representative low-power ATSC television transmitter 21 is described by T. P. Horowitz in U.S. Pat. No. 5,764,701 issued Jun. 9, 1998 and entitled "VSB MODULATOR". The compressed video information and compressed audio information played back from a magnetic tape recording is apt to exhibit some time-base instability owing to irregularities in tape motion. Such time-base instability is preferably corrected by using a time-base stabilizer for reclocking the information from a stable clock source before the information is used in the transmitter 21 to modulate a radio-frequency carrier. This is desirable so that the equalizer employed in an ATSC television receiver receiving the modulated RF carrier will operate properly. Generally, it is simpler to side-step time-base instability problems by supplying the IEEE 1394 Standard signal directly to the packet disassembler in the ATSC television receiver, rather than attempting to link the camcorder to the receiver via RF input.

FIG. 1 shows another optional feature for a camcorder embodying the invention, a low-power NTSC television transmitter 22 adapted for transmitting a radio-frequency signal to an analog television receiver. The compressed audio information selected by the audio/video selector 17 is supplied to a compressed-audio decoder 23. The compressed video information selected by the audio/video selector 17 is supplied to a compressed-video decoder 24. The decoder 24 can be a conventional MPEG-2 video decoder, but is considerably simplified by being modified for decoding only I frames. The decoders 23 and 24 supply de-compressed audio information and de-compressed video information, respectively, to the transmitter 16.

The FIG. 1 camcorder has a liquid-crystal-display (LCD) viewfinder 25. During recording or previewing, viewfinder drive circuitry 26 supplies drive signals to the LCD viewfinder 25 in response to Y, Cr, and Cb signals in 4:2:0 sampling format supplied by the video input processor 2. During playback, viewfinder drive circuitry 26 supplies drive signals to the LCD view finder 25 in response to Y, Cr, and Cb signals in 4:2:0 sampling format supplied by the compressed-video decoder 24. The drive signals applied to the LCD view finder 25 are typically R (red), G (green) and B (blue) drive signals.

Figure 2:
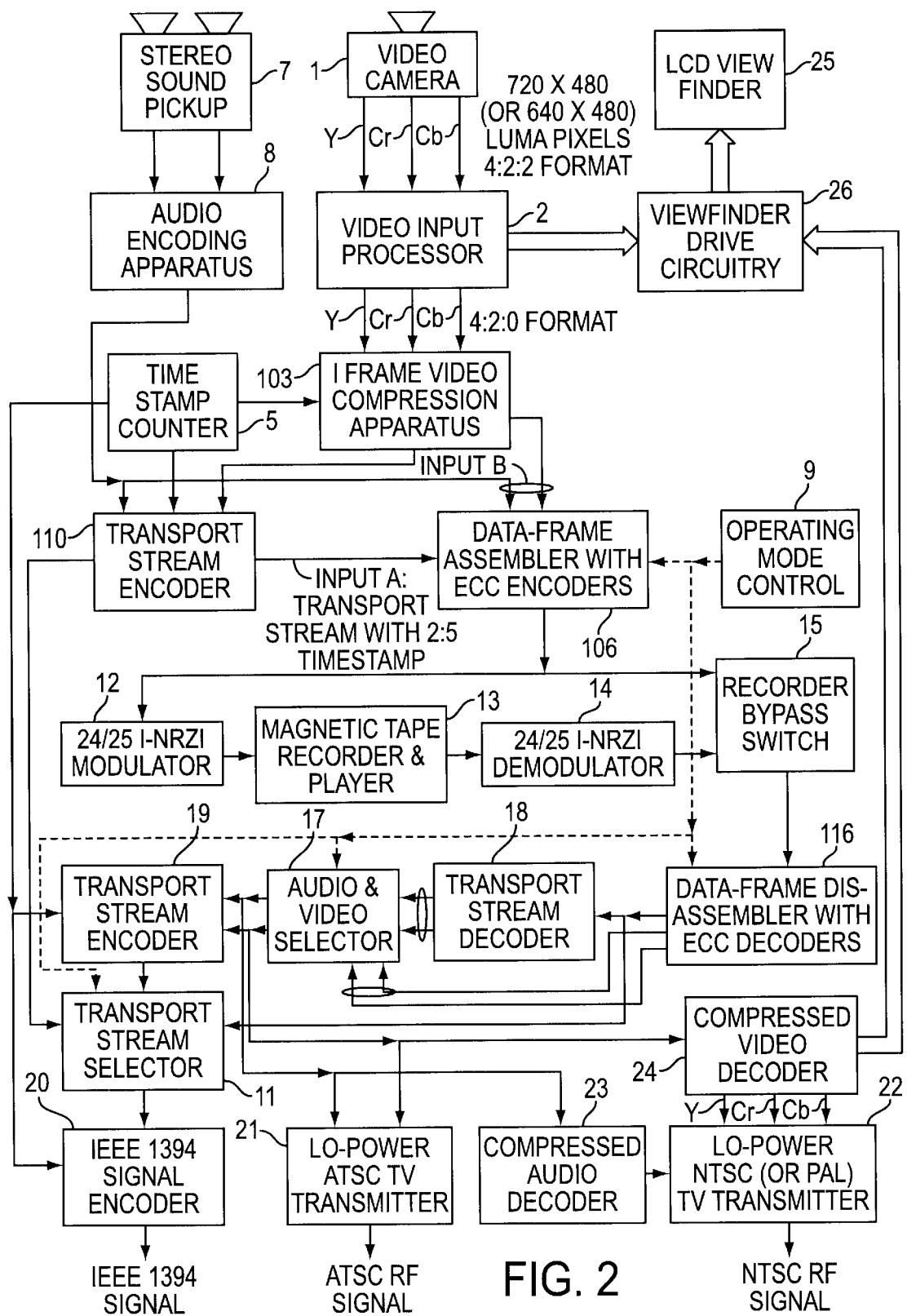

FIG. 2 shows a camcorder that differs from the FIG. 1 camcorder in the way that trickplay is implemented. In the FIG. 2 camcorder the DCT blocks are recorded in the tracks on the electromagnetic tape so that the zero-frequency and other low-frequency DCT coefficients of the succession of DCT blocks of each frame occupy leading portions of syncblocks. During trickplay these zero-frequency and other low-frequency DCT coefficients are recovered for generating a low-resolution display, and the higher-frequency DCT coefficients are discarded. Eliminating the trickplay bands conventionally used in digital video cassette recording increases the average payload data rate from 19.3 million bits per second to 23 million bits per second.

The trickplay extraction circuitry 4 is omitted in the FIG. 2 camcorder, and the video compression apparatus 3 is replaced by video compression apparatus 103 which needs not include provisions to facilitate connection to the trickplay extraction circuitry 4. That is, conventional trickplay information is not recorded in the FIG. 2 camcorder. The transport stream decoder 10 is replaced by a transport stream encoder 110 modified to interface with the video compression apparatus 103, which interface will be described in more detail further when referring to FIG. 6 of the drawing. In the FIG. 2 camcorder the data-frame assembler 6 is replaced by a data-frame assembler 106, which omits syncblocks descriptive of trickplay bands from its assembly procedures and increases the number of syncblocks containing normal-play video packet information in each frame. The data-frame assembler 106 shuffles the order of the DCT coefficients of the succession of DCT blocks of each frame so the zero-frequency and other low-frequency DCT coefficients occupy leading portions of syncblocks. The data-frame disassembler 16 is replaced by a data-frame disassembler 116 that takes into account the recorded signal omitting syncblocks descriptive of trickplay bands and replacing the omitted syncblocks with syncblocks containing further video packet information.

The camcorders of FIGS. 1 and 2 employ CCIR 301 Standard video signals having sixty frames per second and 525 scan lines per frame in accordance with practice in the United States of America. Modifications of these camcorders are readily made so they can employ CCIR 301 Standard video signals having fifty frames per second and 625 scan lines per frame, in accordance with practice in other countries. Such modifications embody the invention in certain of its aspects.

Figure 3:
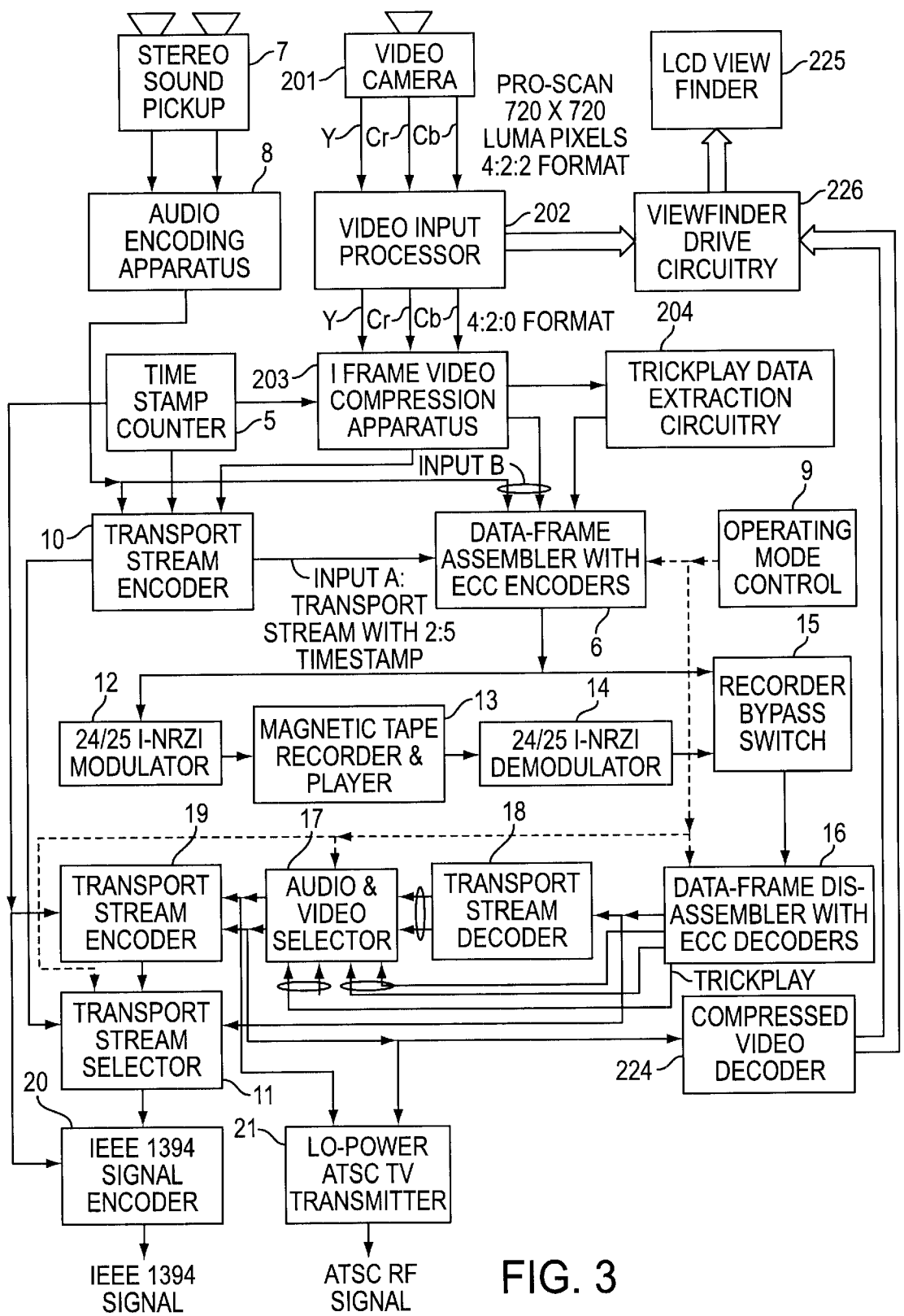

FIG. 3 shows a modification of the FIG. 1 camcorder that uses a video camera 201 for generating progressively scanned frames of video information in 16:9 aspect ratio including luminance (Y) information having 720 active scan lines in each frame and 1280 pixels in each scan line. In a camcorder for home use the video camera 201 is apt to employ a single solid-state imager with a color pattern filter; in a camcorder for broadcast use the video camera 201 is apt to employ beam splitter optics with respective solid-state imager for each of three additive primary colors. Either type of video camera 201 is presumed to include color matrixing circuitry such that the video camera 201 supplies luminance (Y) information, red-minus-luminance (Cr) chrominance information, and blue-minus-luminance (Cb) chrominance information as the components of video information in 4:2:2 format. A video input processor 202 converts the Y, Cr, and Cb signals to 4:2:0 sampling format by performing a 2:1 decimation of each of the Cr and Cb signals in both the vertical and the horizontal directions after separable lowpass anti-aliasing filtering in both directions.

Video compression apparatus 203 receives the Y, Cr, and Cb signals in 4:2:0 sampling format for video compression encoding, which is carried out on an intraframe basis on every one of the frames in accordance with the same intraframe compression encoding protocol that is used on only the first, anchor frame of each group of pictures in MPEG-2 video compression encoding. Trickplay extraction circuitry 204 extracts trickplay information for application to the to the data-frame assembler 6. This trickplay information comprises the zero-frequency and other low-frequency DCT coefficients of the succession of DCT blocks of every frame (or, alternatively, of only periodically occurring frames selected as anchor frames in less preferred embodiments of the invention), as computed in the video compression apparatus 203.

The amount of compressed video data is increased in the FIG. 3 camcorder as compared to the FIG. 1 camcorder, owing to the increased number of pixels per frame. So the compressed high-definition video information in each frame is permitted to occupy twenty recording tracks on the magnetic video tape in the FIG. 3 camcorder, rather than just the ten tracks allotted to each frame of standard definition video information in the FIG. 1 camcorder.

The low-power NTSC television transmitter 22 is dispensed with, owing to the video camera 201 for generating progressively scanned frames of video information in 16:9 aspect ratio. Since the transmitter 22 is not included in the FIG. 3 camcorder, the compressed-audio decoder 23 is omitted. The FIG. 3 camcorder has a liquid-crystal-display (LCD) viewfinder 225 with a viewscreen having 16:9 aspect ratio. The compressed-video decoder 24 is retained, to generate decompressed video signal for viewfinder drive circuitry. During playback (or recording and playback), viewfinder drive circuitry 226 can supply drive signals to the LCD viewfinder 225 in response to Y, Cr, and Cb signals in 4:2:0 sampling format supplied by the decoder 24. During recording or previewing, viewfinder drive circuitry 226 can supply drive signals to the LCD viewfinder 225 in response to Y, Cr, and Cb signals in 4:2:0 sampling format supplied by the video input processor 202. The drive signals applied to the LCD viewfinder 225 are typically R, G and B drive signals.

A low-power NTSC television transmitter is used in a variant of the FIG. 3 camcorder, with arrangements to transmit the 16:9 aspect ratio video images in letter-box format. In such variant the compressed-audio decoder 23 is retained.

Figure 4:
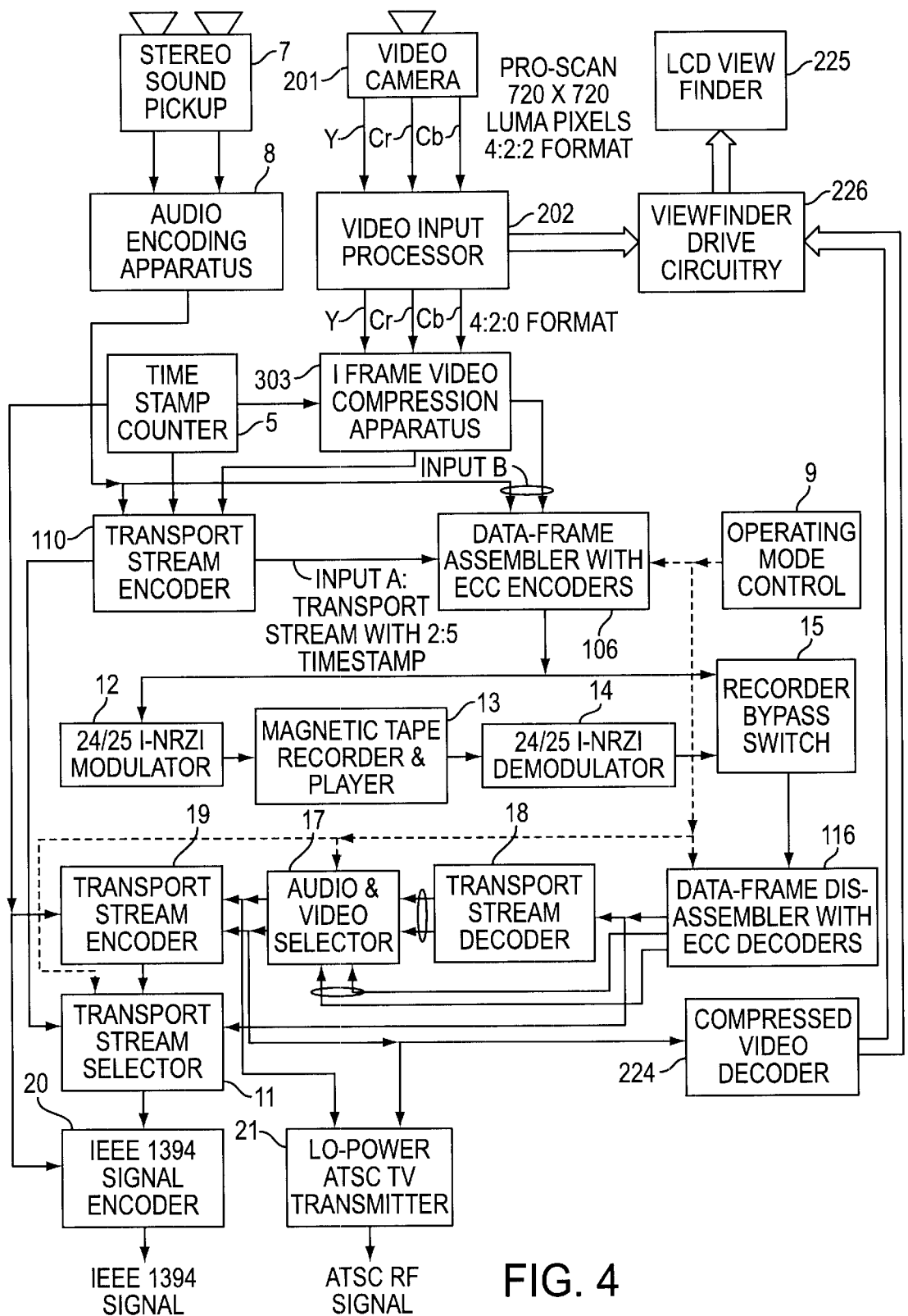

FIG. 4 shows a camcorder that differs from the FIG. 3 camcorder in the way that trickplay is implemented. The DCT blocks are recorded in the tracks on the electromagnetic tape so that the zero-frequency and other low-frequency DCT coefficients of the succession of DCT blocks of each frame occupy leading portions of syncblocks. During trickplay these zero-frequency and other low-frequency DCT coefficients are recovered for generating a low-resolution display, and the higher-frequency DCT coefficients are discarded. With twenty tracks being read in parallel, eliminating the trickplay bands conventionally used in digital video cassette recording increases the average payload data rate from 38.6 million bits per second to 46 million bits per second.

The trickplay extraction circuitry 204 is omitted in the FIG. 4 camcorder, and the video compression apparatus 203 is replaced by video compression apparatus 303 which need not include provisions to facilitate connection to the trickplay extraction circuitry 204. In the FIG. 4 camcorder the data-frame assembler 6 is replaced by the data-frame assembler 106, which omits syncblocks descriptive of trickplay bands from its transport stream assembly procedures and increases the number of syncblocks containing normal-play video packet information in each frame. The data-frame assembler 106 shuffles the order of the DCT coefficients of the succession of DCT blocks of each frame so the direct or zero-frequency DCT coefficient and other low-frequency DCT coefficients occupy leading portions of syncblocks. The Reed-Solomon error correction encoder 9 and the Reed-Solomon error correction decoder 13 are replaced by the Reed-Solomon error correction encoder 109 and the Reed-Solomon error correction decoder 113, respectively, because of the increased number of video syncblocks in an error-correction-coding data frame. The data-frame disassembler 16 is replaced by the data-frame disassembler 116 that takes into account the reproduced transport stream omitting syncblocks descriptive of trickplay bands and replacing the omitted syncblocks with syncblocks containing further video packet information.

In variants of the FIGS. 2 and 4 camcorders, when a transport stream is to be recorded, the data-frame assembler 106 is operated in the following way. The transport stream is put into syncblocks 21 through 155 of each data frame, with no trickplay information being introduced into any of these syncblocks on alternate frames. Instead, the trickplay information is put into syncblocks 2 through 15 of each data frame that are occupied in SD format by audio information and its outer error-correction coding. Syncblocks 2 through 15 are available for trickplay information because audio information is transmitted in audio packets included in the transport stream.

Figure 5:
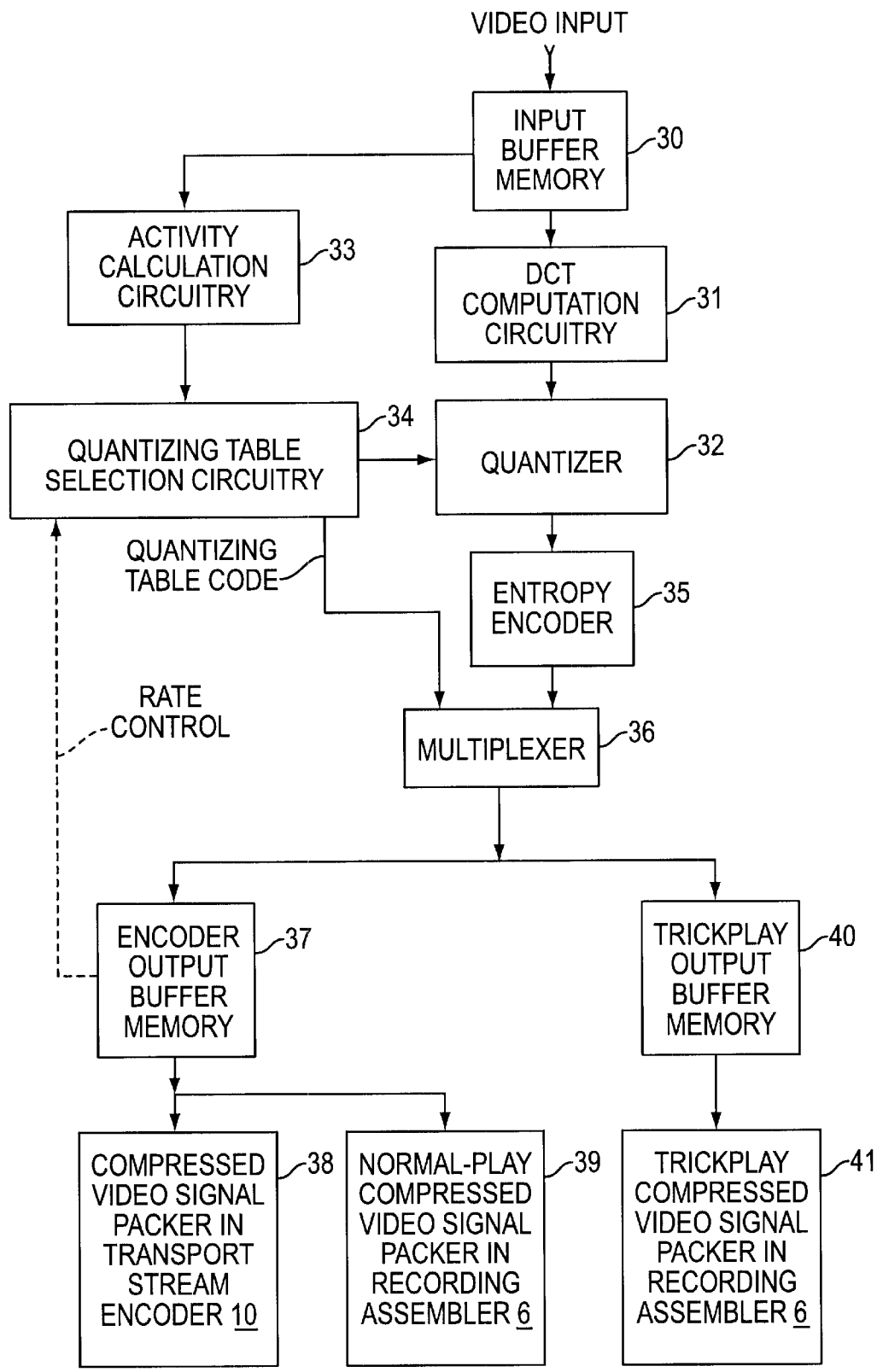
FIG. 5 is a detailed schematic diagram of compressed video signal generation circuitry that can be used in the camcorder of FIG. 1 or 3.

FIG. 5 shows in greater detail the circuitry for compressing video and generating a transport stream used in the FIG. 1 camcorder. Similar circuitry is used in the FIG. 3 camcorder. An input buffer memory 30, DCT computation circuitry 31, quantizer circuitry 32, activity calculation circuitry 33, quantizing table selection circuitry 34, an entropy encoder 35, a multiplexer 36 and an encoder output buffer memory 37 shown in FIG. 5 are elements of the video compression apparatus 3 of FIG. 1. In practice, the DCT computation circuitry 31, quantizer circuitry 32 and activity calculation circuitry 33 may be implemented using a microprocessor. A compressed-video-signal packer 38 of FIG. 5 is associated with the transport stream encoder 10 of FIG. 1, and a compressed-video-signal packer 39 of FIG. 5 is associated with the data-frame assembler 6 of FIG. 1. A trickplay output buffer memory 40 of FIG. 5 is included within the trickplay data extraction circuitry 4 of FIG. 1. A compressed-video-signal packer 41 of FIG. 5 is associated with the data-frame assembler 6 of FIG. 1.

Video input comprising Y, Cr, and Cb signals in 4:2:0 sampling format is loaded into the input buffer memory 30, which stores somewhat more than a frame of samples and permits image blocks eight luma pixels square to be considered one after the other. DCT computation circuitry 31 computes DCT coefficients for the Y, Cr, and Cb components of each successively considered image block, normalizing the higher-order DCT coefficients with regard to the zero-frequency DCT coefficient and supplying the computed DCT coefficients in zigzag scanning order to the quantizer circuitry 32.

The activity calculation circuitry 33 estimates the degree of activity in the image. First, the average value of the pixels in each DCT block is calculated. Then, the difference between the value of each pixel in each DCT block and its average value is determined, and the differences are squared. The squared differences are accumulated for each block, and the resulting sum is normalized by dividing it by the number of pixels per block. The normalized sums for all the DCT blocks in a frame are accumulated, the accumulation result for the frame is multiplied by a first constant value A, and the resulting product has a second constant value B added to it determine the activity in the frame, which directly relates to an estimation of the number of bits in the entropy coding of the frame. This measure of activity in the frame is supplied to quantization table selection circuitry 34, which uses this measure for selecting the initial table of quantizing values for the DCT coefficients that the circuitry 34 supplies to the quantizer circuitry 32. The quantization table selection circuitry 34 supplies a code identifying the table of quantizing values for the DCT coefficients that the circuitry 34 supplies to the quantizer circuitry 32. The quantized DCT coefficients supplied from the quantizer circuitry 32 are supplied to an entropy encoder 35, sometimes referred to as a "Huffman encoder" for lossless coding including steps of run-length coding and variable-length coding.

A multiplexer 36 receives the entropy encoding results from the entropy encoder 35 and also receives the codes identifying the tables of quantizing values for the DCT coefficients that the circuitry 34 supplies to the quantizer circuitry 32. Whenever there is immediately to be a change in the table of quantizing values the quantizer circuitry 32 uses, the multiplexer 36 inserts the code identifying the table next to be used into the codestream it supplies as its output signal. The inserted code serves as a prefix for the entropy encoding results from the entropy encoder 35 that are then reproduced in the codestream the multiplexer 36 supplies as its output signal.

An encoder output buffer memory 37 of a first-in/first-out type temporarily stores the codestream the multiplexer 36 supplies as its output signal. The buffer memory 37 has storage capacity for a fraction (e.g., one-quarter) of the amount of code acceptable in a video frame and signals the quantization table selection circuitry 34 when enough of that storage capacity is used to risk overfilling. Responsive to such signaling, the quantization table selection circuitry 34 selects a quantization table to be used by the quantizer circuitry 32 in order to reduce its rate of bit production. When the storage capacity of the buffer memory 37 is substantially under-utilized for a period of time, the quantization table selection circuitry 34 is signaled to select a quantization table to be used by the quantizer circuitry 32 in order to increase its rate of bit production. This reduces the likelihood of the buffer memory 37 being emptied and thereby avoids the need to use null codes in the codestream supplied from the buffer memory 37 to the compressed-video-signal packers 38 and 39.

The compressed-video-signal packer 38 parses the codestream supplied from the buffer memory 37 into (184-n)-byte video packet payload lengths and prefaces each video packet payload with a respective video packet header. The video packets are incorporated within the transport stream supplied from the transport stream encoder 10 to the data-frame assembler 6. In the data-frame assembler 6, as part of a 2:5 conversion procedure, the video packets are inserted into prescribed sync blocks of each data frame being assembled for recording and then are subjected to two-dimensional Reed-Solomon encoding.

The compressed-video-signal packer 39 parses the codestream supplied from the buffer memory 37 into 77-byte segments for direct insertion into temporary memory within the data-frame assembler 6 at prescribed sync block locations of a data frame being assembled. The 77-byte segments are subsequently subjected to two-dimensional Reed-Solomon encoding procedures within the data-frame assembler 6.

The trickplay output buffer memory 40 is of random-access type and temporarily stores zero- and low-frequency DCT components from the codestream the multiplexer 36 supplies as its description of each sixteenth image frame. Different portions of the contents of the trickplay output buffer memory 40 are read out at various times to the compressed-video-signal packer 41 to be formed into bytes and inserted by the data-frame assembler 6 into prescribed sync blocks of each data frame assembled for recording.

Figure 6:
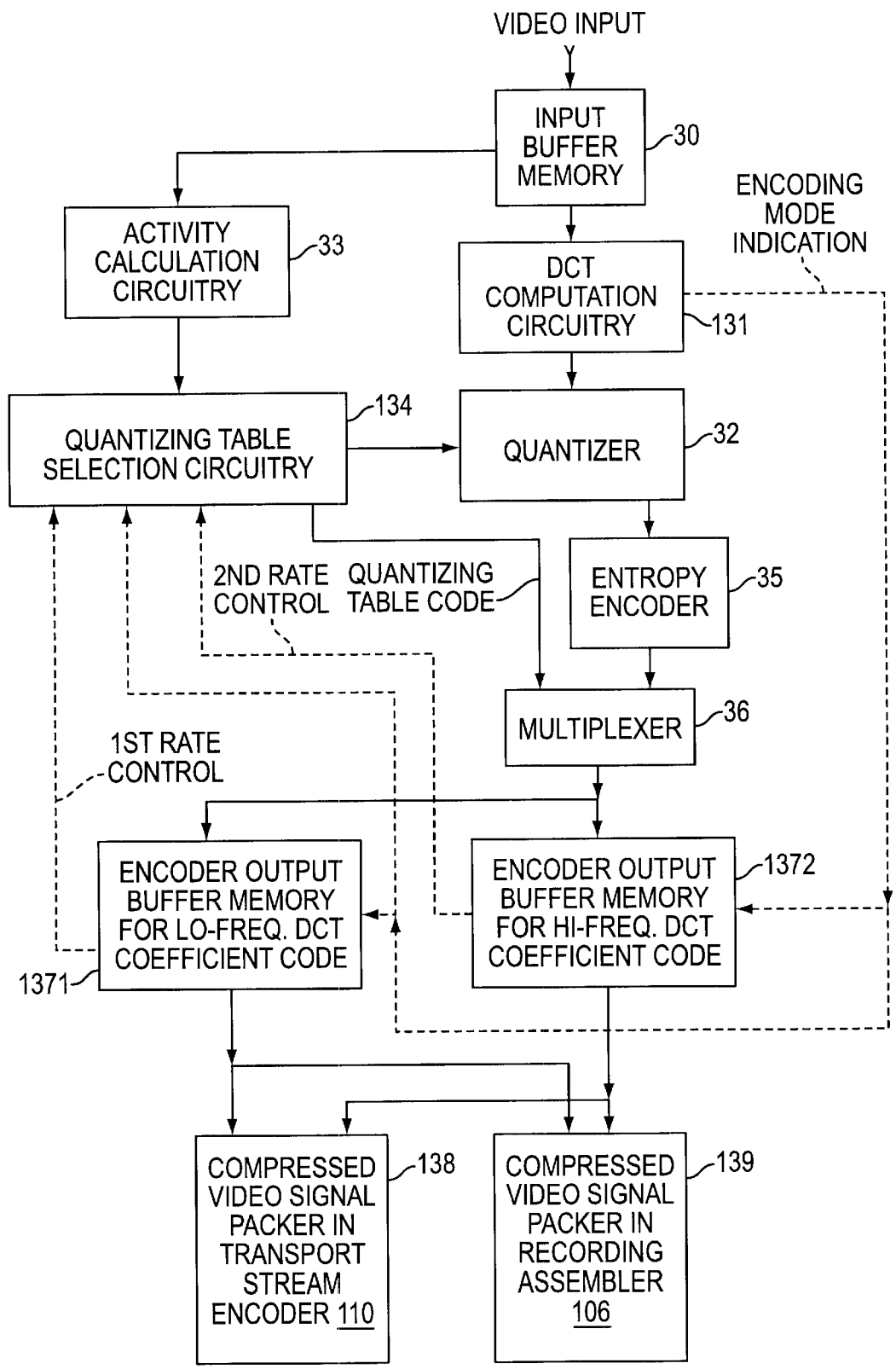
FIG. 6 is a detailed schematic diagram of compressed video signal generation circuitry that can be used in the camcorder of FIG. 1 or 3.

FIG. 6 shows in greater detail the circuitry for compressing video and generating a transport stream used in the FIG. 2 camcorder. Similar circuitry is used in the FIG. 4 camcorder. The input buffer memory 30, DCT computation circuitry 131, the quantizer circuitry 32, the activity calculation circuitry 33, quantizing table selection circuitry 134, the entropy encoder 35, the multiplexer 36, an encoder output buffer memory 1371 for codestream coding zero- and low-frequency DCT coefficients, and an encoder output buffer memory 1372 for codestream coding high-frequency DCT coefficients shown in FIG. 6 are elements of the video compression apparatus 103 of FIG. 2. In practice, the DCT computation circuitry 131, quantizer circuitry 32 and activity calculation circuitry 33 may be implemented using a microprocessor. A compressed-video-signal packer 138 of FIG. 6 is associated with the transport stream encoder 110 of FIG. 2, and a compressed-video-signal packer 139 of FIG. 6 is associated with the data-frame assembler 106 of FIG. 2.

The transport stream generated by the transport stream encoder 110 comprises video and audio packets, and is characterized by the video packets being formed with the codes descriptive of the zero- and low-frequency DCT coefficients immediately after syncblock headers, so as to facilitate trickplay.

The DCT computation circuitry 131 is implemented so as to provide an ENCODING MODE INDICATION indicative of whether the computation results are low-frequency DCT coefficients (including zero-frequency coefficients) or are high-frequency DCT coefficients. When the ENCODING MODE INDICATION indicates that the computation results are zero- or low-frequency DCT coefficients, the buffer memory 1371 is conditioned to store the computation results, and the quantizing table selection circuitry 134 conditions the quantizer 32 to apply quantizing tables for the zero- or low-frequency DCT coefficients. When the ENCODING MODE INDICATION indicates that the computation results are high-frequency DCT coefficients, the buffer memory 1372 is conditioned to store the computation results, and the quantizing table selection circuitry 134 conditions the quantizer 32 to apply quantizing tables for the high-frequency DCT coefficients.

The buffer memory 1371 is a first-in/first-out memory for storing two parallel bitstreams. One of the bitstreams composed of the entropy code and quantizing table code associated with the zero- and low-frequency DCT coefficients. The other bitstream is composed of markers indicating breaks between DCT blocks in the computation of the zero- and low-frequency DCT coefficients. The markers facilitate the compressed-video-signal packers 138 and 139 arranging the codes descriptive of the zero- and low-frequency DCT coefficients in bit ranges immediately after syncblock headers. These bit ranges extend for prescribed intervals or somewhat longer. The compressed-video-signal packer 138 in the transport stream encoder 110 makes allowance in its packing for the transport stream headers and extra time stamps being included in the transport stream before its being parsed into syncblocks in the data-frame assembler 110. The compressed-video-signal packer 139 used in the data-frame assembler 106 for recording compressed video signal that is not converted to transport stream format performs its packing without such allowance being made nor having to be made. When a marker first occurs after a prescribed interval following syncblock header, each of the compressed-video-signal packers 138 and 139 discontinues packing code from the buffer memory 1371 and begins to pack code from the buffer memory 1372 instead. Packing code from the buffer memory 1372 then continues until the end of the syncblock is reached. The quantizing table selection circuitry 134 receives a first rate control signal from the buffer memory 1371 and a second rate control signal from the buffer memory 1372 for controlling the selection of quantization tables, so that quantization tables can be chosen to keep the amount of information each buffer memory stores within prescribed limits.

Figure 7:
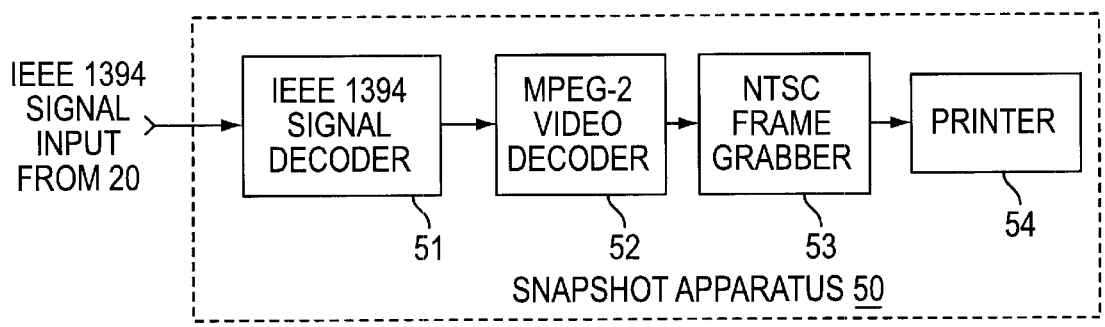
FIG. 7 is a schematic diagram of snapshot apparatus as can be used with the camcorder of FIGS. 1 or 2.

FIG. 7 shows snapshot apparatus 50 suited for use with the camcorder of FIGS. 1 or 2. The snapshot apparatus 50 includes an IEEE 1394 signal decoder 51 for the IEEE 1394 signal from the IEEE 1394 signal encoder 20, an MPEG-2 decoder 52 for decoding video packets supplied from the decoder 51, a frame grabber 53 for NTSC video frames, and a printer 54 for producing a hard copy reproduction of the grabbed NTSC video frame. The frame grabber 53 is a memory for snatching from a continuous stream of digital video signal samples those data descriptive of a single selected frame of video and, by way of example, employs a small magnetic disk memory. A modified MPEG-2 decoder only for I frames can be used in the snapshot apparatus 50.

Figure 8:
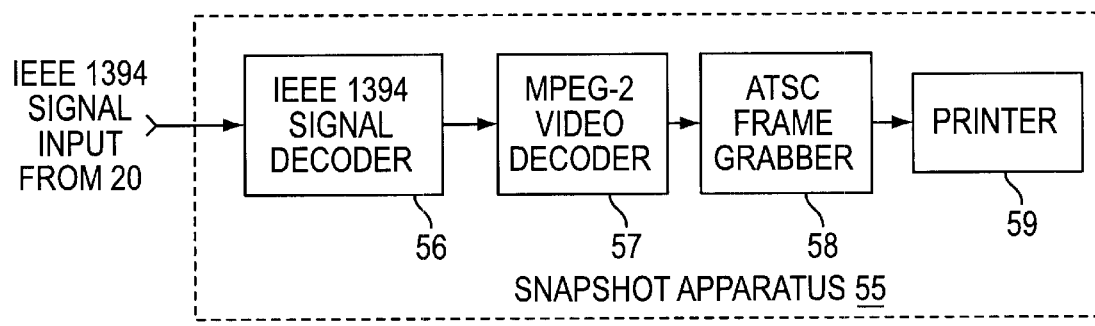
FIG. 8 is a schematic diagram of snapshot apparatus as can be used with the camcorder of FIGS. 3 or 4.

FIG. 8 shows snapshot apparatus 55 suited for use with the camcorder of FIGS. 3 or 4. The snapshot apparatus 55 includes an IEEE 1394 signal decoder 56 for the IEEE 1394 signal from the IEEE 1394 signal encoder 20, an MPEG-2 decoder 57 for decoding video packets supplied from the decoder 56, a frame grabber 58 for ATSC video frames, and a printer 59 for producing a hard copy reproduction of the grabbed ATSC video frame. A modified MPEG-2 decoder only for I frames can be used in the snapshot apparatus 55.

One skilled in the art will be enabled by the foregoing description and the accompanying drawing readily to construct other embodiments of the invention that are equivalent to those specifically described; and the claims which follow should be construed to include obvious design variations within their scope. For example, error-correction coding of components of the transport stream can be performed at least in part before assembling the transport stream from its component parts. By way of further example, error-correction decoding of components of the transport stream can be performed at least in part after disassembling the transport stream into its component parts. In the claims which follow, the term "MPEG-2 decoding apparatus" is to be construed to apply to a complete MPEG-2 decoder, capable of decoding P and B frames as well as I frames, and also to apply to modifications of such decoder that decode only I frames.

What is claimed is:

1. A camcorder comprising:
    a video camera responsive to light images for supplying video signals on a frame by frame basis;
    circuitry responsive to the video signals supplied by said video camera for generating segments of a compressed digital video signal, which segments are susceptible to decoding by an MPEG-2 decoding apparatus; and
    a recorder for electromagnetically recording said compressed digital video signal as magnetic variations along the surface of a magnetic recording medium, wherein said circuitry for generating a compressed digital video signal susceptible to decoding by an MPEG-2 decoding apparatus includes:
        circuitry for intraframe coding consecutive frames of said video signals as I frames within the MPEG-2 standard protocol, for inclusion in said compressed digital video signal.

2. The camcorder of claim 1, further comprising a transport stream encoder responsive to said compressed digital video signal for generating a transport stream supplied with 2:5 conversion to said recorder during an interval of time, said compressed digital video signal being directly supplied to said recorder without 2:5 conversion during another interval of time.

3. The camcorder of claim 2, wherein said recorder is of a type for electromagnetically recording said digital recording signal on a tape coated with magnetic material.

4. The camcorder of claim 3, wherein said recorder is of a type for electromagnetically recording said compressed digital video signal as I-NRZI modulation.

5. The camcorder of claim 3, wherein said recorder is of a type for electromagnetically recording said compressed digital video signal as 24/25 I-NRZI modulation.

6. The camcorder of claim 2, wherein said recorder is of a type for electromagnetically recording said compressed digital video signal as I-NRZI modulation.

7. The camcorder of claim 2, wherein said recorder is of a type for electromagnetically recording said compressed digital video signal as 24/25 I-NRZI modulation.

8. The camcorder of claim 1, wherein said recorder is of a type for electromagnetically recording said digital recording signal on a tape coated with magnetic material.

9. The camcorder of claim 8, wherein said recorder is of a type for electromagnetically recording said compressed digital video signal as I-NRZI modulation.

10. The camcorder of claim 8, wherein said recorder is of a type for electromagnetically recording said compressed digital video signal as 24/25 I-NRZI modulation.

11. The camcorder of claim 1, wherein said recorder is of a type for electromagnetically recording said compressed digital video signal as I-NRZI modulation.

12. The camcorder of claim 1, wherein said recorder is of a type for electromagnetically recording said compressed digital video signal as 24/25 I-NRZI modulation.

13. A camcorder comprising:
    a video camera responsive to light images for supplying video signals on a frame by frame basis;
    circuitry responsive to the video signals supplied by said video camera for generating segments of a compressed digital video signal, which segments are susceptible to decoding by an MPEG-2 decoding apparatus, said circuitry including trickplay extraction circuitry for extracting zero-frequency DCT coefficients and low frequency DCT coefficients for use as trickplay data and outputting said trickplay data, wherein said circuitry for generating a compressed digital video signal susceptible to decoding by an MPEG-2 decoding apparatus includes circuitry for intraframe coding consecutive frames of said video signals as I frames within the MPEG-2 standard protocol, for inclusion in said compressed digital video signal;
    a first memory for storing said trickplay data and outputting a first rate control signal based on fullness of said first memory;
    a second memory for storing said segments of the compressed digital video signal, excluding said trickplay data, and outputting a second rate control signal based on fullness of said second memory;
    quantizing table selection circuitry for selecting a level of quantization of the compressed digital video signal based on said first rate control signal and said second rate control signal; and
    a recorder for electromagnetically recording said compressed digital video signal as magnetic variations along the surface of a magnetic recording medium.

* * * * *